United States Patent
Stamatakis et al.

(10) Patent No.: US 11,184,257 B2
(45) Date of Patent: *Nov. 23, 2021

(54) SYSTEM, METHOD AND APPARATUS FOR BRIDGE INTERFACE COMMUNICATION

(71) Applicant: Senseware, Inc., Vienna, VA (US)

(72) Inventors: Julien G. Stamatakis, Centreville, VA (US); Nathan A. Sacks, Arlington, VA (US)

(73) Assignee: Senseware, Inc., Vienna, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/199,322

(22) Filed: Nov. 26, 2018

(65) Prior Publication Data

US 2019/0097903 A1 Mar. 28, 2019

Related U.S. Application Data

(63) Continuation of application No. 15/099,663, filed on Apr. 15, 2016, now Pat. No. 10,142,196.

(51) Int. Cl.
| | |
|---|---|
| *G06F 15/16* | (2006.01) |
| *H04L 12/26* | (2006.01) |
| *H04L 29/08* | (2006.01) |
| *H04L 12/28* | (2006.01) |

(52) U.S. Cl.
CPC .............. *H04L 43/04* (2013.01); *H04L 12/28* (2013.01); *H04L 12/2823* (2013.01); *H04L 67/12* (2013.01)

(58) Field of Classification Search
CPC ..... H04L 43/04; H04L 12/28; H04L 12/2823; H04L 67/12

USPC ................................................ 709/220, 221
See application file for complete search history.

(56) References Cited

U.S. PATENT DOCUMENTS

| | | | | |
|---|---|---|---|---|
| 4,003,487 A | * | 1/1977 | Downing | B66F 17/003 414/629 |
| 5,987,990 A | * | 11/1999 | Worthington | G01N 29/14 73/40.5 A |
| 7,106,843 B1 | * | 9/2006 | Gainsboro | H04M 3/2281 379/191 |
| 7,379,981 B2 | | 5/2008 | Elliott et al. | |
| 7,646,230 B2 | * | 1/2010 | Parfitt | G05B 19/054 327/265 |
| 8,103,389 B2 | | 1/2012 | Golden et al. | |
| 8,352,651 B2 | * | 1/2013 | Parfitt | G05B 19/054 710/62 |
| 8,368,513 B2 | * | 2/2013 | Brown | G06K 7/0008 340/10.1 |
| 8,977,336 B2 | * | 3/2015 | Huennekens | A61B 5/0066 600/407 |

(Continued)

OTHER PUBLICATIONS

Cloud Logger, 38 Zeros, 2015.

(Continued)

*Primary Examiner* — Thu Ha T Nguyen

(57) ABSTRACT

A system, method and apparatus for bridge interface communication. A node device can be connected to one or more bridge units using a universal sensor interface. A controller in a node device can communicate with a controller in a bridge unit device using a bi-directional data line. In one embodiment, the bridge unit can account for variable amounts of delay in gathering sensor data using availability signaling.

20 Claims, 10 Drawing Sheets

(56) References Cited

U.S. PATENT DOCUMENTS

| | | | | |
|---|---|---|---|---|
| 9,300,706 | B1* | 3/2016 | Wise | G06K 9/00221 |
| 9,534,929 | B1 | 1/2017 | Stamatakis et al. | |
| 9,534,930 | B1 | 1/2017 | Stamatakis | |
| 9,538,578 | B1 | 1/2017 | Stamatakis et al. | |
| 9,551,594 | B1 | 1/2017 | Stamatakis | |
| 9,554,236 | B1 | 1/2017 | Stamatakis | |
| 9,679,491 | B2* | 6/2017 | Canoy | G06N 20/00 |
| 9,714,843 | B1* | 7/2017 | Stamatakis | H04W 24/02 |
| 9,714,844 | B1 | 7/2017 | Stamatakis et al. | |
| 9,756,511 | B1 | 9/2017 | Stamatakis et al. | |
| 9,762,979 | B1 | 9/2017 | Stamatakis et al. | |
| 9,763,118 | B1 | 9/2017 | Stamatakis et al. | |
| 9,800,646 | B1 | 10/2017 | Stamatakis et al. | |
| 9,802,322 | B2* | 10/2017 | Angle | G06Q 10/1095 |
| 9,813,489 | B1 | 11/2017 | Stamatakis et al. | |
| 9,872,153 | B2* | 1/2018 | Zampini, II | G01S 5/0226 |
| 9,876,653 | B1 | 1/2018 | Stamatakis | |
| 9,888,336 | B1 | 2/2018 | Stamatakis | |
| 9,929,772 | B2* | 3/2018 | Rose | H04B 1/1036 |
| 9,942,693 | B2 | 4/2018 | Stamatakis | |
| 9,986,411 | B1 | 5/2018 | Stamatakis | |
| 10,142,196 | B1* | 11/2018 | Stamatakis | H04L 43/04 |
| 10,143,038 | B1 | 11/2018 | Stamatakis | |
| 10,149,141 | B1 | 12/2018 | Stamatakis et al. | |
| 10,171,891 | B1* | 1/2019 | Stamatakis | H04L 67/12 |
| 10,171,972 | B2 | 1/2019 | Stamatakis et al. | |
| 10,178,638 | B1 | 1/2019 | Stamatakis et al. | |
| 10,220,899 | B2* | 3/2019 | Yang | B60R 25/2018 |
| 10,948,379 | B2* | 3/2021 | Knauss | G01M 3/24 |
| 2002/0075163 | A1* | 6/2002 | Smith | G01D 21/00 340/870.16 |
| 2004/0190092 | A1* | 9/2004 | Silverbrook | H04N 1/00376 358/539 |
| 2005/0024510 | A1* | 2/2005 | Lapstun | H04N 5/378 348/294 |
| 2006/0146377 | A1* | 7/2006 | Marshall | G06T 3/4038 358/486 |
| 2007/0211681 | A1* | 9/2007 | Sun | H04L 45/04 370/338 |
| 2008/0077336 | A1* | 3/2008 | Fernandes | G01R 15/142 702/57 |
| 2009/0063760 | A1* | 3/2009 | Weddle | G06F 13/1689 711/104 |
| 2010/0271199 | A1* | 10/2010 | Belov | G01M 5/0008 340/539.3 |
| 2011/0285589 | A1* | 11/2011 | Bull | G01S 5/0242 342/387 |
| 2014/0207282 | A1* | 7/2014 | Angle | G05B 15/02 700/257 |
| 2014/0320309 | A1* | 10/2014 | Zhang | A61B 5/0002 340/870.07 |
| 2015/0277536 | A1* | 10/2015 | Vanka | G06F 1/3296 713/320 |
| 2015/0316945 | A1* | 11/2015 | Soya | H04L 67/306 700/295 |
| 2016/0112518 | A1 | 4/2016 | Haleem et al. | |
| 2016/0127875 | A1* | 5/2016 | Zampini, II | G01S 5/00 370/311 |
| 2016/0214198 | A1* | 7/2016 | Hsu | G01C 25/00 |
| 2016/0353238 | A1* | 12/2016 | Gherardi | H04W 4/021 |
| 2016/0359872 | A1* | 12/2016 | Yadav | H04L 63/1425 |
| 2017/0230907 | A1* | 8/2017 | Rose | H04W 52/0277 |
| 2018/0000344 | A1* | 1/2018 | Melodia | H04W 84/18 |
| 2018/0025603 | A1* | 1/2018 | Tyler | G06Q 10/0833 340/572.1 |
| 2018/0027386 | A1* | 1/2018 | Zampini, II | H04W 52/0296 370/311 |
| 2019/0008461 | A1* | 1/2019 | Gupta | G16H 10/40 |
| 2019/0038932 | A1* | 2/2019 | Eckblad | G09B 19/0038 |
| 2019/0072925 | A1* | 3/2019 | Cella | H04L 67/10 |
| 2019/0132815 | A1* | 5/2019 | Zampini, II | G06Q 50/06 |
| 2019/0324431 | A1* | 10/2019 | Cella | G06N 3/006 |
| 2019/0364492 | A1* | 11/2019 | Azizi | H04W 48/16 |
| 2020/0284883 | A1* | 9/2020 | Ferreira | G01S 7/4816 |
| 2020/0348662 | A1* | 11/2020 | Cella | G05B 23/0289 |
| 2021/0089572 | A1* | 3/2021 | Lawlor | G06N 20/00 |

OTHER PUBLICATIONS

Smart Processing Starts at the Edge of the Network, B+B Smartworx, 2014.

Wireless Sensors and Output Devices, ConnectSense, 2015.

It's Time You Experienced Eclypse, Distech Controls, 2014.

Compact Sensor, Enlighted, 2015.

Energy Manager, Enlighted, 2015.

Gateway, Enlighted, 2015.

Enlighted Smart Sensor, 2015.

Manning, Lauren, "Wireless Infrastructure Provider Filament Closes $5m Series A, Shows Promise for Agtech Application," Aug. 21, 2015.

Intellastar, 2015.

Your Internet of Things, Monnit, 2014.

Monnit Industrial Wireless AC Current Meter, 2015.

$3^{rd}$ Generation Nest Learning Thermostat, 2015.

AcquiSuite+ Dtaa Acquisition Server, Obvius, LLC, Installation and Operation Manual, Model A8814, Jan. 11, 2014.

Application Note: ModHopper Makes Submetering Easy, Obvius, LLC, Mar. 29, 2012.

ModHopper—Wireless Modbus/Pulse Transceiver, Obvius, LLC, Installation and Operation, Model R9120 (Rev C), Dec. 11, 2012.

Atmel Corporation, 8-bit AVR Microcontroller with Low Power 2.4GHz Transceiver for ZigBee and IEEE 802.15.4, 2014.

Application Note, Atmel AT06482: Real Color ZLL LED Light Bulb with ATmega256RFR2—Software User's Guide, 2013.

Application Note, AT06412: Real Color ZLL LED Light Bulb with ATmega256RFR2—Hardware User Guide, 2014.

Exploring New Lighting Opportunities with ZigBee Light Link Webinar, May 16, 2012.

Point Six Wireless Wi-Fi Sensor Product Guide, 2015.

Eagle, Rainforest Automation, 2015.

Product Comparison Guide, SmartStruxture Lite solution and wireless devices for SmartStruxture solution, Schneider Electric, Mar. 12, 2015.

SmartStruxure Lite Solution, SEC Series, Smart Terminal Controller (SEC-TE), Schneider Electric, Aug. 1, 2013.

SmartStruxure Lite Solution, Schneider Electric, May 1, 2015.

SmartStruxure Lite Solution, Our open system approach to standards and protocols, Schneider Electric, Jul. 2, 2014.

Senseware, Mar. 25, 2014.

Product Data Sheet, SWS-DPC Wireless Pulse Counters, SpinWave Systems, Inc., 2007.

Product Data Sheet, SWC-TSTAT-3 Wireless Thermostat Controller, SpinWave Systems, Inc., 2012.

A3 Wireless Sensor Network, SpinWave Systems, Inc., 2007.

Veris Industries, 2015.

U.S. Appl. No. 62/025,640, entitled "Separation of Current Sensor and Voltage Sensor for True Power Measurement," filed Jul. 17, 2014.

Khamphanchai et al., Conceptual Architecture of Building Energy Management Open Source Software (BEMOSS), 5th IEEE PES Intelligent Smart Grid Technologies (ISGT) European Conference, Oct. 12-15, 2014.

DOLPHIN Core Description, EnOcean, Jul. 21, 2014.

Remote Management 2.0, EnOcean, Mar. 6, 2013.

EnOcean—The World of Energy Harvesting Wireless Technology, Feb. 2015.

Wireless Sensor Solutions for Home & Building Automation—The Successful Standard Uses Energy Harvesting, EnOcean, Aug. 10, 2007.

Metasys® System Product Bulletin, Code No. LIT-1201526, Release 7.0, Dec. 5, 2014.

Metasys® System Extended Architecture Wireless Network, Application Note, Oct. 24, 2006.

(56) References Cited

OTHER PUBLICATIONS

Metasys® System Field Equipment Controllers and Related Products, Product Bulletin, Code No. LIT-12011042, Software Release 5.0, Jun. 21, 2010.
ZFR1800 Series Wireless Field Bus System, Technical Bulletin, Code No. LIT-12011295, Software Release 10.1, Dec. 5, 2014.
Wireless Metasys® System Product Bulletin, Code No. LIT-12011244, Software Release 5.0, Jan. 4, 2010.
Environmental Index™—Balancing Efficiency with Comfort, Automated Logic Corporation, 2013.
Equipment Portal, Automated Logic Corporation, 2013.
EnergyReports™ Web Application—A Tool for Sustainable Building Operations, Automated Logic Corporation, 2013.
WebCTRL®—Powerful and Intuitive Front End for Building Control, Mar. 26, 2015.
ISelect Adds New Portfolio Company: Bractlet, 2015.
Know—Bractlet.
Analyze—Bractlet.
Ensure—Bractlet.
Announcing Samsara: Internet connected sensors, May 18, 2015.
Samsara—Internet Connected Sensors.
Samsara—Features.
Samsara—Models.
Samsara—API.
Microchip, PIC24FV32KA304 Family, 2013.

\* cited by examiner

SYSTEM, METHOD AND APPARATUS FOR BRIDGE INTERFACE COMMUNICATION

This application is a continuation of non-provisional application Ser. No. 15/099,663, filed Apr. 15, 2016, which is incorporated herein by reference in its entirety.

BACKGROUND

Field

The present disclosure relates generally to sensor applications, including a system, method and apparatus for bridge interface communication.

Introduction

Sensors can be used to monitor physical environment conditions. Wireless sensor networks can be used to collect data from distributed sensors and to route the collected sensor data to a central location.

BRIEF DESCRIPTION OF THE DRAWINGS

In order to describe the manner in which the above-recited and other advantages and features can be obtained, a more particular description will be rendered by reference to specific embodiments thereof which are illustrated in the appended drawings. Understanding that these drawings depict only typical embodiments and are not therefore to be considered limiting of its scope, the disclosure describes and explains with additional specificity and detail through the use of the accompanying drawings in which.

DETAILED DESCRIPTION

Various embodiments are discussed in detail below. While specific implementations are discussed, it should be understood that this is done for illustration purposes only. A person skilled in the relevant art will recognize that other components and configurations may be used without parting from the spirit and scope of the present disclosure.

Sensors provide a mechanism for discovering and analyzing a physical environment at a monitored location. In general, a monitored location can represent any area where one or more sensors are deployed. The monitored location may or may not represent a physical area having clearly defined boundaries. As would be appreciated, the extent of the sensor application itself provides a sense of boundary to the monitored location. In one example, the monitored location can represent a building such as a home, hotel, industrial facility, school, hospital, community building, stadium, airport, convention center, warehouse, office building, store, restaurant, mall, shopping center, data center, multi-dwelling unit, or other defined building structure. In another example, the monitored location can represent an area of control such as a vehicle or container in any mode of transport, a service area, an entertainment area, an asset collection area, a construction zone, or any monitored area that can be fixed or movable. In yet another example, the monitored location can represent an area proximate to an article, device, person or other item of interest upon which one or more sensors are attached.

Figure 1:
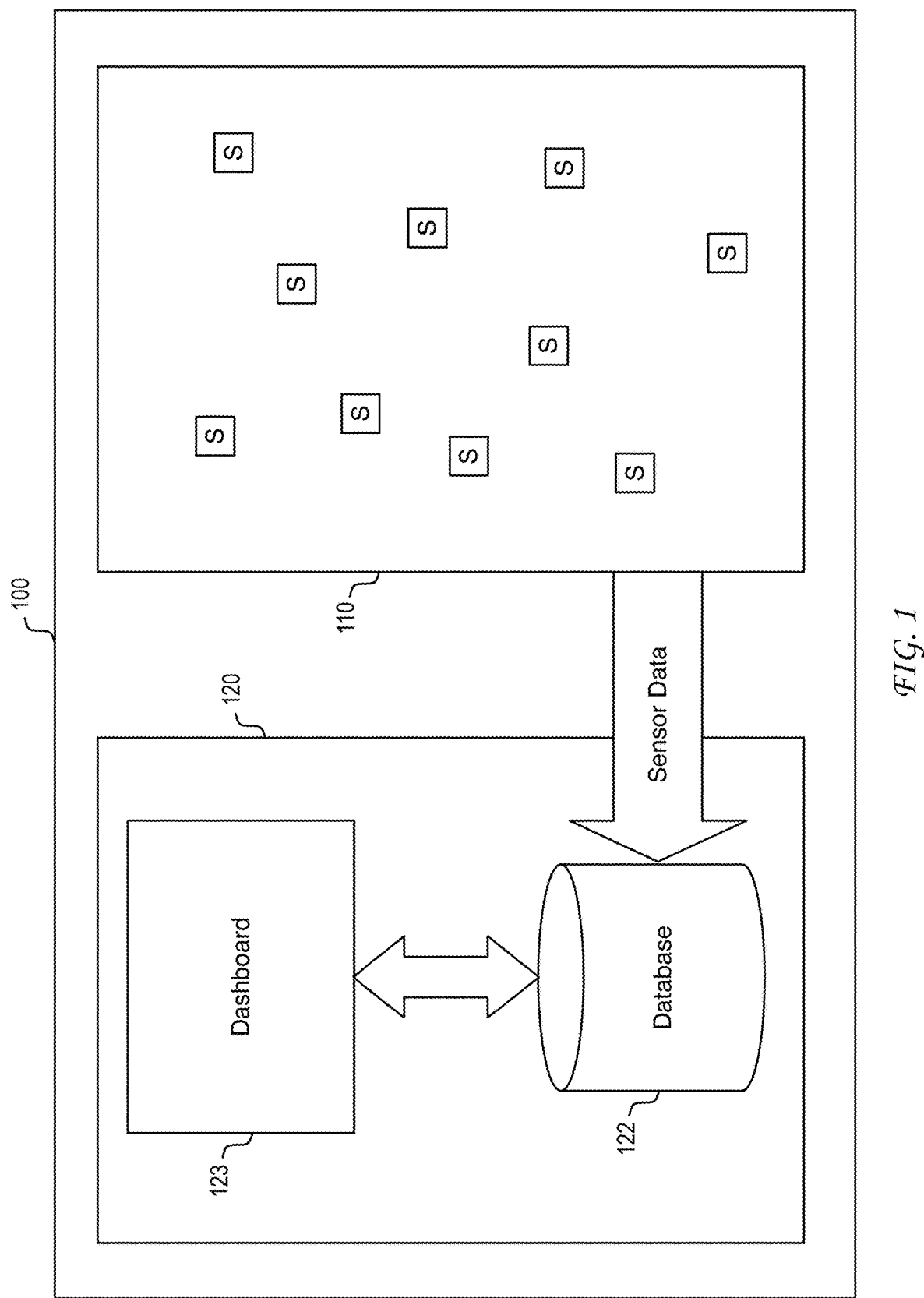
FIG. 1 illustrates an example of a sensor data management system.

FIG. 1 illustrates an example of the collection and analysis of data from sensors installed at a monitored location. As illustrated, sensor data management system 100 collects sensor data from a plurality of sensors installed at monitored location 110. This collection portion of sensor data management system 100 provides sensor data to control and analysis portion 120. Control and analysis portion 120 includes database 122 for storage of the collected sensor data. Dashboard 123 can be embodied as an online platform that allows a customer to view the sensor data from monitored location 110. Dashboard 123 can therefore represent a management tool authored by sensor data management system 100 that helps promote visualization and customer understanding of the sensor data.

The deployment of individual sensors at a monitored location is part of the growing trend of the Internet of Things (IoT). The connectivity of the individual sensors through a wireless sensor network enables inclusion of those sensors as part of an open network. A sensors as a service model (SaaS) promotes the open usage of the sensors and the data collected by them to any party having an interest in at least part of the monitored location.

Figure 2:
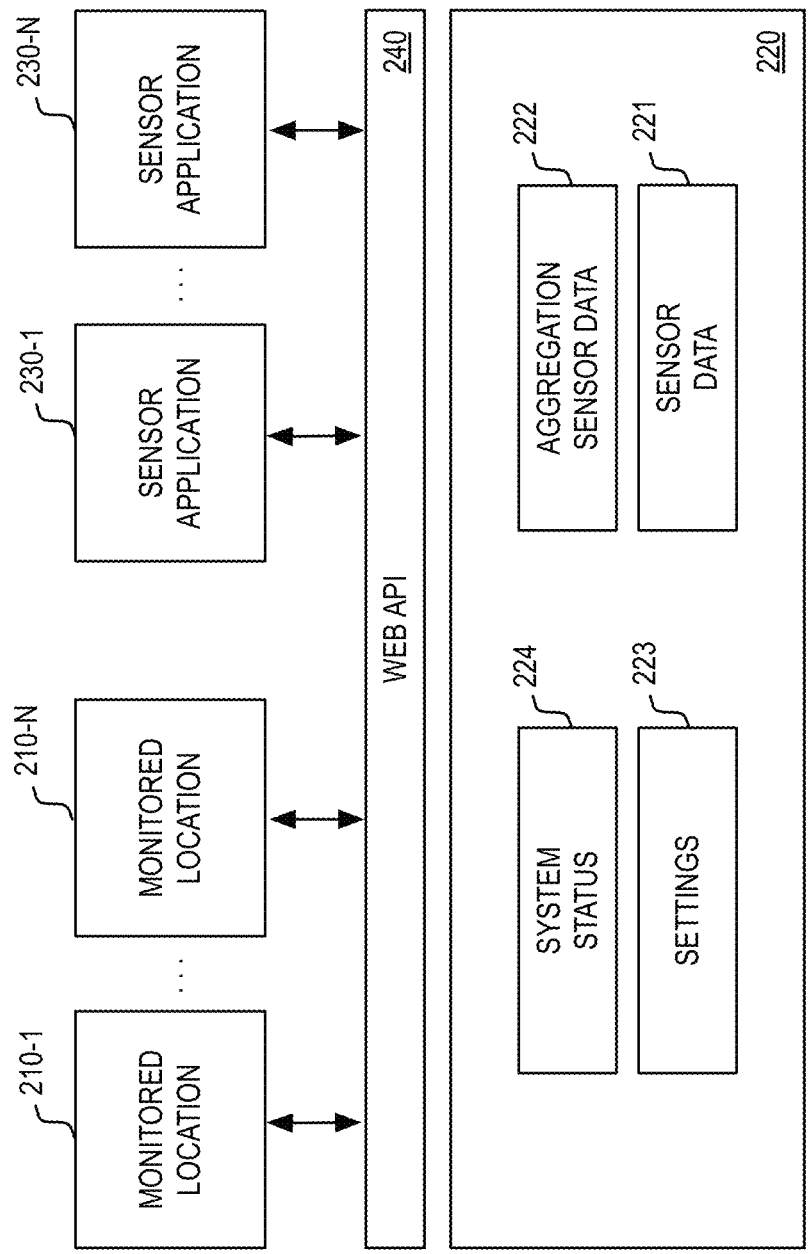
FIG. 2 illustrates an example framework that enables discrete sensor application development in a sensors as a service model.

FIG. 2 illustrates an example framework that enables discrete sensor application development in a SaaS model. Central to this SaaS model is host system 220. In general, one or more servers in host system 220 can be configured to facilitate the various processes that enable a collection of sensor data from the plurality of monitored locations 210-$n$, processing and storage of sensor data in a database, and a distribution of sensor data to a plurality of sensor applications 230-$n$. The plurality of monitored locations 210-$n$ and the plurality of sensor applications 230-$n$ can interface with host system 220 via web application programming interface (API) 240. In one embodiment, web API 240 would be based on HTTP methods such as GET, PUT, POST, and DELETE.

As illustrated, host system 220 can collect sensor data from the plurality of monitored locations 210-$n$ via web API 240. For example, host system 220 can receive the latest sensor readings using HTTP POST methods from the plurality of monitored locations 210-$n$. Via web API 240, host system 220 can collect a first set of sensor data from a first plurality of sensors installed at a first monitored location, collect a second set of sensor data from a second plurality of sensors installed at a second monitored location, . . . and collect an $N^{th}$ set of sensor data from an $N^{th}$ plurality of sensors installed at an $N^{th}$ monitored location. The N collected sets of sensor data can be stored in a database as sensor data 221. In one embodiment, aggregation data 222 can also be generated by host system 220 based on sensor data 221. In general, aggregation data 222 can represent any sensor data 221 that has been processed.

In one application, a sensor data value can be transformed via a defined conversion relationship into a single aggregation sensor data value. For example, a number of detected pulses can be transformed using a defined conversion relationship into a measure of consumption (e.g., power). In another application, a plurality of sensor data values can be processed through a defined conversion relationship into a single aggregation sensor data value. For example, a plurality of sensor data values can be analyzed to determine whether an alert should be triggered. In another example, a plurality of sensor data values such as voltage and current can be processed to produce a measure of power. In yet another scenario, a plurality of sensor data values can be grouped together into an aggregation of sensor data values. For example, a plurality of sensor data values can be grouped together to produce a customer report.

Sensor data 221 and/or aggregation sensor data 222 are accessible by a plurality of sensor applications 230-n via web API 240. More specifically, host system 220 can provide a first set of sensor data 221 and/or aggregation sensor data 222 upon request by a first sensor application, provide a second set of sensor data 221 and/or aggregation sensor data 222 upon request by a second sensor application, . . . and provide an $N^{th}$ set of sensor data 221 and/or aggregation sensor data 222 upon request by an $N^{th}$ sensor application. Each of the distributed sets of sensor data 221 and/or aggregation sensor data 222 can support the respective needs of the requesting sensor application 230-n. The respective needs can relate to all or part of one or more monitored locations 210-n. The scope of a sensor application 230-n in meeting a particular customer need would dictate the amount of sensor data 221 and/or aggregation sensor data 222 that is provided.

In one scenario, the set of sensor data 221 and/or aggregation sensor data 222 can relate to a specific set of sensors in a part of a monitored location 210-n occupied by a building tenant. In another scenario, the set of sensor data 221 and/or aggregation sensor data 222 can relate to a particular type of sensor (e.g., power) in one or more monitored locations 210-n. In yet another scenario, the set of sensor data 221 and/or aggregation sensor data 222 can relate to a subset of sensors in a particular monitored location 210-n over a specified time period (e.g., day, week, month, or other defined period of time) to perform an audit of conditions of the physical environment at that monitored location 210-n. Here, it should also be noted, that the set of sensor data 221 and/or aggregation sensor data 222 provided to a first sensor application can overlap in part with the set of sensor data 221 and/or aggregation sensor data 222 provided to a second sensor application.

As would be appreciated, a distributed set of sensor data 221 and/or aggregation sensor data 222 can be customized to the needs of a particular sensor application 230-n. In that way, the systematic collection, processing and storage of sensor data by host system 220 can be viewed as a sensor service from the perspective of sensor applications 230-n. Significantly, any sensor application 230-n can request data associated with any sensor at any monitored location 210-n over any time period via web API 240. New sensor applications can continually be developed for analysis of sensor data 221 and/or aggregation sensor data 222, thereby increasingly leveraging sensor data 221 and aggregation sensor data 222. Host system 220 can therefore be positioned as a sensor data service platform upon which front-end sensor applications 230-n can be built.

In implementing a full-featured sensor service, host system 220 can also enable sensor applications 230-n to customize the collection and processing of sensor data. This customization increases the adaptability and flexibility of the sensor service in meeting the needs of the sensor applications 230-n. In one embodiment, sensor applications 230-n can customize the operation of the sensor service using web API 240. These customizations can be stored in a database as settings 223.

In one example, a sensor application 230-n can specify a conversion function via web API 240 for application to one or more values of sensor data. The conversion function can be stored in the database as settings 223 and applied to one or more values of sensor data 221 to produce one or more values of aggregation sensor data 222. In this manner, a sensor application 230-n can specify one or more conversion functions that are configured to prepare a set of inputs for use by the sensor application 230-n. One advantage of the specification of such conversion functions is that the sensor application 230-n is assured of receiving data of a known type, of a known quantity, of a known accuracy, of a known format, or of any other expected characteristic for processing by the sensor application 230-n. In one scenario, this can be used to ensure that sensor application 230-n can be easily re-purposed from another sensor application environment to the particular sensor service supported by host system 220.

In general, the conversion functions can be used to create standardized outputs from data generated by different types of sensors. Another advantage of the specification of such conversion functions is that the sensor application 230-n can be designed to operate at a specified level of complexity relative to host system 220. In one scenario, a sensor application 230-n can offload analysis functions to host system 220, thereby enabling the sensor application 230-n to perform simple functions (e.g., alerts) on received aggregation sensor data 222. This scenario would be useful in allowing sensor application 230-n to be implemented as a light-weight sensor application 230-n for download and installation on a mobile computing device. This would be in contrast to a full-featured sensor application 230-n that is intended for installation on a server device and which is designed for heavy-duty processing and analysis functions. As would be appreciated, conversion functions can be used to facilitate a customized interaction between a sensor application 230-n and host system 220.

In another example, a sensor application 230-n can specify destinations for the distribution of sensor data 221 and/or aggregation sensor data 222. For example, a sensor application 230-n can specify that separate subsets of sensor data 221 and/or aggregation sensor data 222 be distributed to different destinations. In this framework, the separate subsets of sensor data 221 and/or aggregation sensor data 222 may or may not correspond to distinct physical parts of a monitored location. More generally, each subset of sensor data 221 and/or aggregation sensor data 222 can relate to a separate interest by a sensor application 230-n to sensor data 221 and/or aggregation sensor data 222 produced by one or more monitored locations 210-n. In one embodiment, sensor data 221 and/or aggregation sensor data 222 can be distributed to defined destinations using JavaScript Object Notation (JSON) formatted packets.

In another example, a sensor application 230-n can specify, via web API 240, configuration settings for application to a sensor network at a monitored location 210-n.

The control provided by the specification of these configuration settings via web API 240 enables a sensor application 230-*n* to configure a sensor network at a monitored location 210-*n* from a remote location. In various scenarios, the remote configuration commands would customize the operation of a sensor network at a monitored location 210-*n* to meet the needs of a given sensor application 230-*n*.

In one example, the customization of the operation of a sensor network at a monitored location 210-*n* can include an activation or deactivation of a sensor at the monitored location 210-*n*. This activation or deactivation can correspond to particular hours, days, weeks, months, or other periods of time. In one scenario, the activation or deactivation commands can correspond to relevant periods of interest in the sensor data, wherein the relevant periods of interest correspond to activity relating to tenant occupancy, auditing, monitoring and verification, sales support, or other activities that have non-contiguous periods of interest and/or control.

In another example, the customization of the operation of a sensor network at a monitored location 210-*n* can include a change in the operation of a sensor at the monitored location 210-*n*. In various scenarios, the change in operation of the sensor can relate to a sensitivity characteristic, an accuracy characteristic, a power characteristic, an energy saving characteristic, an operating mode characteristic, a data type or format characteristic, or any other characteristic that relates to an operation of the sensor or the data produced by the sensor. In one embodiment, the sensor is supported by a bridge unit having an interface (e.g., Modbus serial communication protocol) to the sensor. In this embodiment, the change in operation can relate to a device address, a function code, a register address, or any other parameter that facilitates a collection of sensor data via the interface. As would be appreciated, the specific interface supported by the bridge unit would be implementation dependent.

In another example, the customization of the operation of a sensor network at a monitored location 210-*n* can include a change in the operation of a node in a sensor network at the monitored location 210-*n*. In various scenarios, the customization can relate to a frequency of sensor data collection, a sampling frequency, a power characteristic, an energy saving characteristic, an operating mode characteristic (e.g., reset command), a data type or format characteristic, a sensor network preference, a control action to be effected by the node, or any other characteristic that relates to an operation of the node.

After customization commands have been forwarded to a monitored location 210-*n*, the sensor network at monitored location 210-*n* can return system status information via web API 240. This system status information can be recorded in the database as system status 224. A sensor application 230-*n* can then retrieve system status information from host system 220 via web API 240 to confirm that the requested configuration changes have been correctly implemented by the sensor network at the monitored location 210-*n*.

The configuration afforded via web API 240 enables a sensor application 230-*n* to customize the operation of a sensor network from a location remote from the monitored location 210-*n*. Notably, the sensor application 230-*n* can customize the operation of only part of the sensor network at a monitored location 210-*n*. For example, a first sensor application can be configured to provide an energy management company with a view of sensor data relating to power consumption at a building, while a second sensor application can be configured to provide a tenant in the building with a view of sensor data relating to ambient conditions (e.g., temperature and humidity) in a part of the building. As these examples illustrate, a plurality of sensor applications 230-*n* can be configured to leverage different subsets of sensors at one or more monitored locations 210-*n*. From that perspective, host system 220 provides a sensor service to a plurality of sensor applications 230-*n* having varied interests into the detected physical environment at the various monitored location 210-*n*.

Sensor applications can be generated for use across a variety of categories. A first example category can include Resource Management sensor applications that can each be configured to manage consumable resources such as electricity, water, gas, storage space, office space, conference rooms, or any other measured resource. A second example category can include Monitoring and Verification sensor applications that can each be configured to monitor and verify operation of a system (e.g., HVAC) in a monitored location. In one example, a monitoring and verification application can be used to perform audits of a system in a monitored location. A third example category can include Tenant Billing sensor applications that can each be configured to generate bills for tenants for measured usage of some resource (e.g., electricity). A fourth example category can include Reports and Alerts sensor applications that can each be configured to perform compilation and analysis of sensor data and/or aggregation data. In one example, an alert sensor application can include complex analytic functions that can predict occurrence of future maintenance actions at a monitored location based on historical data produced by one or more sensors. A fifth example category can include Control sensor applications that can each be configured to implement a control action based on an analysis of sensor data and/or aggregation sensor data. In one example, a control sensor application can be configured to restrict usage of a consumable resource based on an analysis of current usage relative to a budget. A sixth example category can include Industry Specific sensor applications that are targeted to a particular industry context. For example, a first set of sensor applications can be specifically directed to the particular needs of schools, while a second set of sensor applications can be specifically directed to the particular needs of condominium buildings. As would be appreciated other categories of applications that leverage sensor data can be defined for any market segment.

Figure 3:
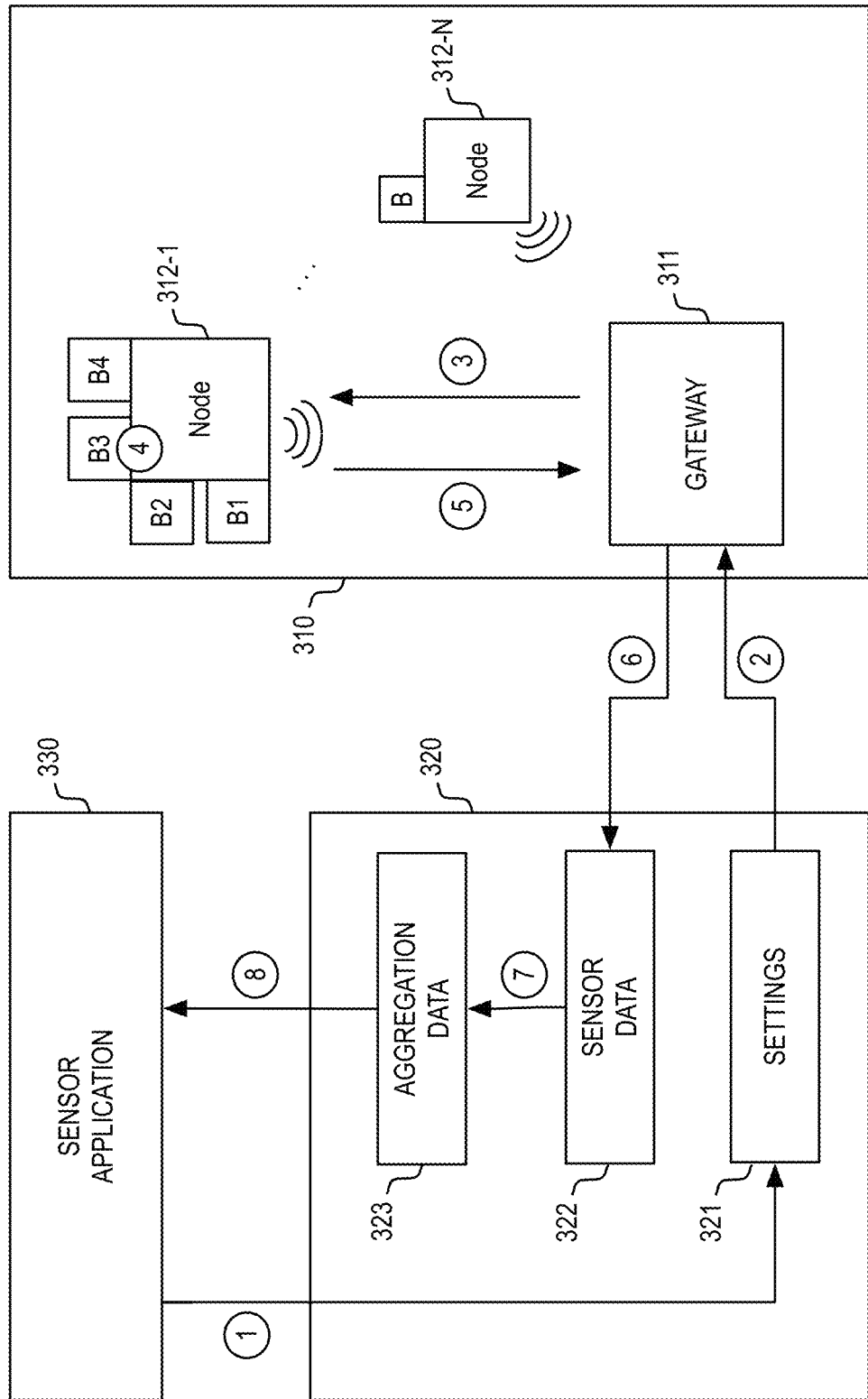
FIG. 3 illustrates an example of a sensor application process.

To illustrate the operation of a host system in providing a sensor service, reference is now made to FIG. 3, which illustrates an example of a sensor application process. As illustrated, monitored location 310 includes gateway 311, which communicates with host system 320 via a network connection. The network connection can be embodied in various forms depending upon the particular characteristics of monitored location 310. For example, where monitored location 310 is a building in a developed area, then the network connection can be facilitated by a wired Internet connection via an Internet service provider (ISP). In another example, the network connection can be facilitated by a terrestrial or satellite based wireless network to accommodate a remote physical area (or movable area) that may or may not include a building structure. Here, it should be noted that multiple gateways can be used at a monitored location, wherein each gateway supports a different set of nodes and can have a separate network connection to the host system.

In one embodiment, gateway 311 communicates wirelessly with a plurality of node devices 312-*n* that form a sensor network. In one embodiment, the communication protocol between the plurality of node devices 312-*n* is based on the IEEE 802.15.4 protocol. The sensor network facilitates a communication infrastructure that can be used to support the bi-directional communication between host system 320 and node devices 312-*n*. In one embodiment, each of node devices 312-*n* can be configured to support one or more bridge units via universal sensor interfaces. For example, node device 312-1 is illustrated as supporting bridge units B1-B4. As will be described in greater detail below, each bridge unit can be configured to support one or more sensor elements.

In the example process of FIG. 3, assume that sensor application 330 requires (1) sensor data from readings from sensor elements supported by bridge unit B3 attached to node device 312-1 to be taken every 60 seconds, (2) a voltage measurement and current measurement to be combined into a power measurement, and (3) the resulting power measurement data to be placed into a particular data format for input into an analytics module of sensor application 330. In various scenarios, the data format can relate to singular sensor data values and/or can relate to multiple sensor data values.

As illustrated, the process can begin with the communication by sensor application 330 of configuration settings to host system 320. This part of the process is illustrated as process element "1" in FIG. 3. In one embodiment, sensor application 330 can submit configuration settings to host system 320 via web APIs. The submitted configuration settings can be stored in a database as settings 321, and can be used as the basis for adjusting the configuration of the sensor network at monitored location 310 and to adjust the processing of sensor data 322 received from monitored location 310. In this example, a first configuration setting can be stored that would be the basis for modifying a data collection period of the sensor elements supported by bridge unit B3 attached to node device 312-1, a second configuration setting can be stored that would be the basis for a conversion function for generation of a power measurement from a voltage measurement and current measurement generated by the sensor elements supported by bridge unit B3 attached to node device 312-1, and a third configuration setting can be stored that would be the basis for a conversion function to place the generated power measurement into the data format desired by sensor application 330.

As illustrated in FIG. 3, the stored configuration settings 321 that specify the new data collection period can be used by host system 320 in generating a configuration setup request (illustrated as process element "2" in FIG. 3) for delivery to gateway 311 at monitored location 310. In one embodiment, the configuration setup request is an HTTP message delivered in response to a system status message from node device 312-1 (e.g., HTTP POST method) received by host system 320 from gateway 311 via the web API. For example, when the system status message is received, host system 320 can compare the current configuration settings (e.g., default sensor data collection period) to the newly stored custom configuration setting in the database. When the comparison indicates that the current configuration does not match the newly stored custom configuration setting, then host system 320 can initiate the transmission of a configuration setup request having the newly stored custom configuration setting.

In one embodiment, the comparison can be based on a comparison of two computed hash values. The first computed hash value can be generated by node device 312-1 based on the current configuration settings of node device 312-1 and/or a bridge unit attached to node device 312-1 and can be returned to host system 320 as part of a system status message by node device 312-1. The second computed hash value can be generated by host system 320 based on the stored configuration settings 321 for node device 312-1 and/or a bridge unit attached to node device 312-1. One of the advantages of using hash values to confirm the configuration settings of a node device or bridge unit is that it would obviate the need for the node device to transmit all of the configuration settings of the node device and/or bridge unit back to the host system for comparison.

Where the configuration setup request relates to an operation of node device 312-1, gateway 311 can deliver a configuration update packet containing the configuration update data to node device 312-1 via the sensor network. This communication is illustrated as process element "3" in FIG. 3. Based on the receipt of configuration update via the sensor network, node device 312-1 can adjust the data collection period for bridge unit B3. This configuration change is illustrated as process element "4" in FIG. 3. Based on the change in configuration, node device 312-1 can collect sensor readings from bridge unit B3 at the newly defined collection period (e.g., 60 seconds). The sensor data values collected at the newly defined collection period can then be delivered by node device 312-1 to gateway 311 in data packets via the sensor network. This communication is illustrated as process element "5" in FIG. 3.

In forwarding the received sensor data values to host system 320, gateway 311 can prepare an HTTP POST method that submits the latest sensor data value for recording in the database. This communication is illustrated as process element "6" in FIG. 3. The received sensor data value can be stored in a database as sensor data 322.

Based on the first defined conversion function stored in settings 321, host system 320 can transform sensor data 322 into aggregation sensor data 323. For example, host system 320 can transform a first sensor data value based on a voltage measurement and a second sensor data value based on a current measurement into an aggregation sensor data value reflective of a power measurement. Based on the second defined conversion function stored in settings 321, host system 320 can place one or more aggregation sensor data values into a data format desired by sensor application 330. In one example, the second defined conversion function defines a data format for the singular power measurement data values. In another example, the second defined conversion function defines a data format for multiple power measurement values in a report. In the illustration of FIG. 3, the combined conversion process of the first and second defined conversion functions is illustrated as process element "7". The resulting aggregation sensor data 323 has now been prepared for the particular use by sensor application 330. In one embodiment, sensor application 330 can retrieve sensor data and/or aggregation sensor data 323 using an HTTP GET method via the web API. The communication of sensor data 322 and/or aggregation sensor data 323 from host system 320 to sensor application 330 is illustrated as process element "8" in FIG. 3.

As this example process illustrates, sensor application 330 can configure a sensor network at a monitored location using a web API. In this manner, any sensor application can configure an operation of any sensor network at any monitored location to suit its particular needs. Moreover, any sensor application can configure a customized processing of sensor data collected from any sensor network at any monitored location to suit its particular needs. In essence, sensor application 330 can define and configure the particular SaaS it desires to receive from host system 320. Significantly, sensor application 330 need not have any connection to the installation of the sensor network at the monitored location. From the perspective of sensor application 330, the sensor network is part of an established infrastructure that is used only when sensor data is needed and in a scope that is defined by sensor application 330.

Figure 4:
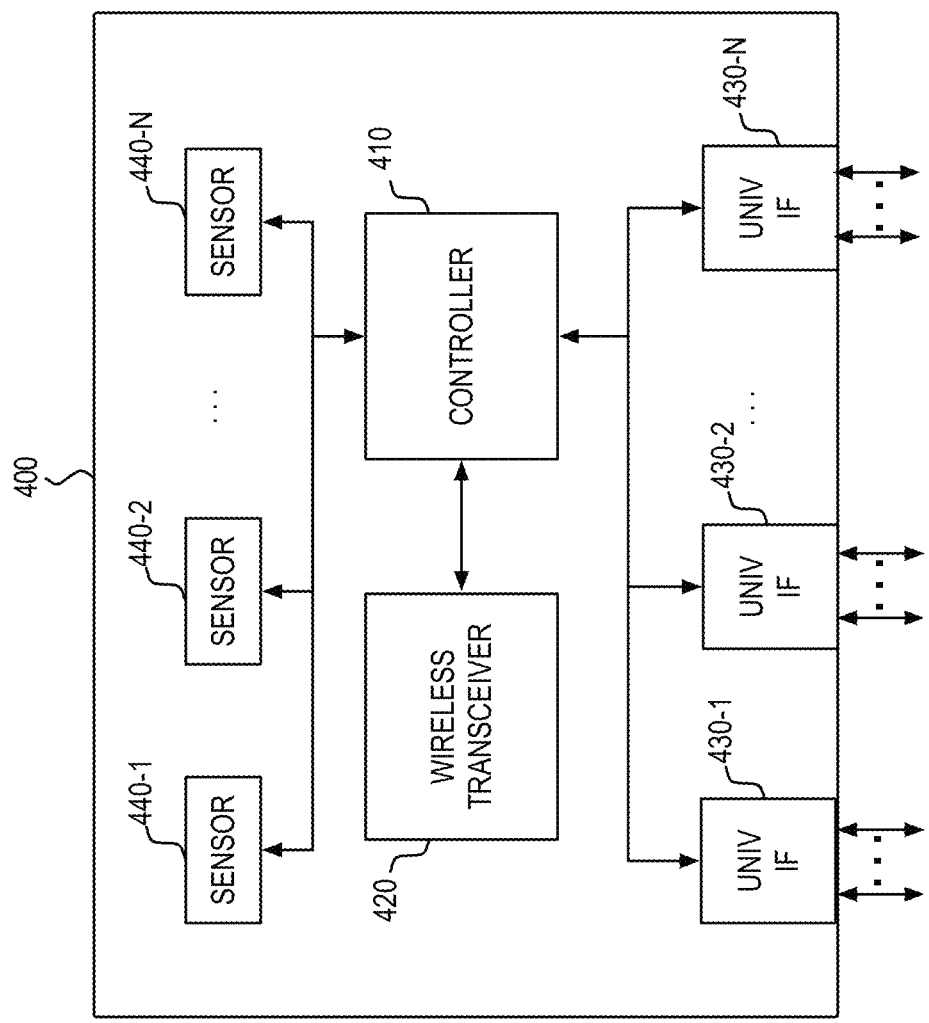
FIG. 4 illustrates an example embodiment of a node device.

FIG. 4 illustrates an example embodiment of a node device in the sensor network. As illustrated, node device 400 includes controller 410 and wireless transceiver 420. Wireless transceiver 420 facilitates wireless communication between node device 400 and a gateway or another node device that operates as a relay between node device 400 and the gateway. In one embodiment, node device 400 includes a wired transceiver (e.g., Ethernet) in addition to or as a replacement for wireless transceiver 420. The wired transceiver would enable node device 400 to communicate with a gateway over a wired link.

Controller 410 can be configured to collect sensor measurements from a set of bridge units via one or more universal sensor interfaces 430-$n$. Controller 410 can also collect measurements from one or more sensors 440-$n$ that are contained within or otherwise supported by a housing of node device 400. In various scenarios, the one or more sensors 440-$n$ can facilitate monitoring at that part of the monitored location, including the health and/or status of node device 400. Each universal sensor interface 430-$n$ can support the connection of node device 400 with a separate bridge unit. The plug-and-play universal sensor interface facilitates the separation of the node communication infrastructure from the sensor-specific interfaces supported by the set of one or more bridge units that are deployed at the location at which the supporting node is installed.

Universal sensor interfaces 430-$n$ can represent a combination of hardware and software. The hardware portion of universal sensor interfaces 430-$n$ can include a wired interface that enables communication of different signals between node device 400 and a connected bridge unit. In one example, the wired interface can be enabled through a connector interface, which is exposed by the housing of node device 400, and that is configured to receive a bridge unit connector via removable, pluggable insertion. The software portion of the universal sensor interfaces 430-$n$ can include a protocol that allows node device 400 to send data to and receive data from a bridge unit.

A gateway can be configured to operate similarly to a node device. In addition to wireless transceiver 420, a gateway can include a second transceiver (e.g., Ethernet) that supports a network connection with the host system. The gateway can also collect data based on measurements by a plurality of sensors that are contained within or otherwise supported by a housing of the gateway. Finally, the gateway can also collect data from a bridge unit that is connected to the gateway via a universal sensor interface. In one embodiment, the gateway includes a single universal sensor interface for limited expandability as compared to node devices.

Figure 5:
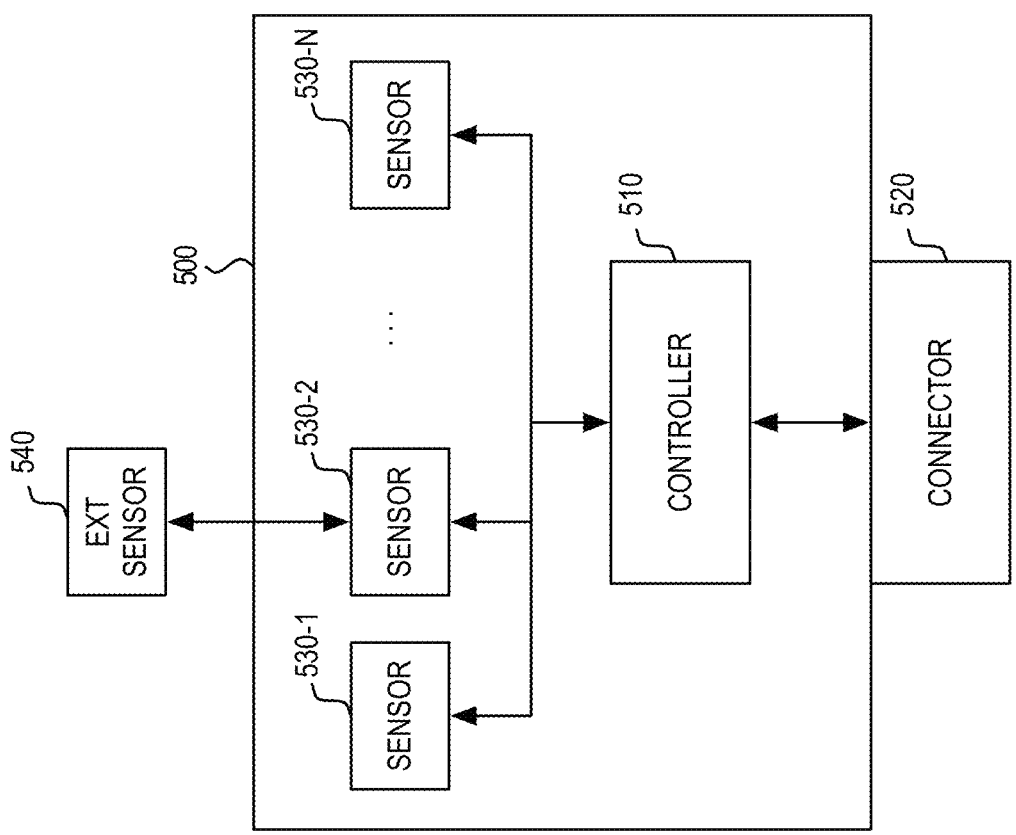
FIG. 5 illustrates an example embodiment of a bridge unit.

FIG. 5 illustrates an example embodiment of a bridge unit designed for attachment to a node device, an example of which was described with reference to FIG. 4. As illustrated, bridge unit 500 includes controller 510 that communicates over a universal sensor interface with a supporting node device. In the illustrated embodiment, bridge unit 500 supports the universal sensor interface with a connector 520 configured for pluggable, removable insertion into a corresponding connector interface exposed by the supporting node device. In another embodiment, the bridge unit can be coupled to the connector interface exposed by the supporting node device via a connector attached to a cable. In yet another embodiment, controller 510 can be coupled to a controller in a node device via a hard-wired connection, thereby enabling greater levels of integration.

Bridge unit 500 can support a plurality of sensor elements 530-$n$. For example, sensor elements supported by bridge unit 500 can enable one or more of the following: a temperature sensor application, a humidity sensor application, an air quality (e.g., $CO_2$) sensor application, a light sensor application, a sound sensor application, an occupation sensor application, a radiation sensor application, a contact sensor application, a pulse sensor application, a water sensor application, a power sensor application, a credential sensor application, or any other type of sensor application configured to measure a characteristic associated with a physical environment of a part of the monitored location.

In one embodiment, a sensor element can cooperate with an external sensor element to produce sensor data. For example, sensor element 530-2 can cooperate with external sensor element 540 to gather energy monitoring data. In one scenario, sensor element 530-2 can be embodied as a pulse sensor that is configured to connect to an external energy monitoring meter product. In another scenario, sensor element 530-2 can communicate with external sensor element 540 via a Modbus interface, BACnet interface, or any other interface designed for communication with a monitoring product. As would be appreciated, the particular method of cooperation between internal and external sensor elements supported by bridge unit 500 would be implementation dependent.

Figure 6:
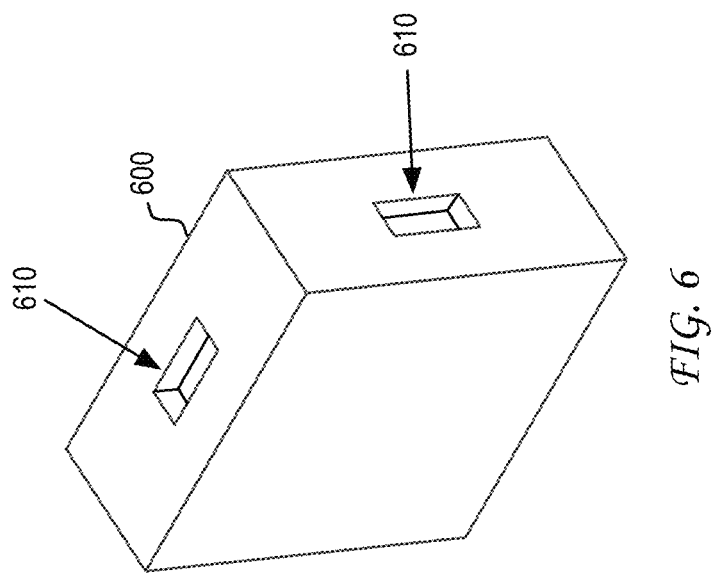
FIG. 6 illustrates an example embodiment of a housing of a node device that exposes connector interfaces.

FIG. 6 illustrates an example embodiment of a housing of a node device such as the example illustration of node device 400 in FIG. 4. As illustrated, node device 600 can have a housing configured to expose a plurality of connector interfaces 610. Each of the plurality of connector interfaces 610 can support the physical attachment of a single bridge unit. In the example illustration, each side of the housing of node device 600 exposes a single connector interface 610. In the present disclosure, it is recognized that the housing of the node device can be substantially larger than the housing of the bridge unit. This can result, for example, because the node device can be designed with additional components such as an internal power source (e.g., battery) that can involve additional volume requirements as compared to the bridge units. It is therefore recognized that one embodiment of a node device can have multiple bridge units physically attached to a single side of the node device.

Figure 7:
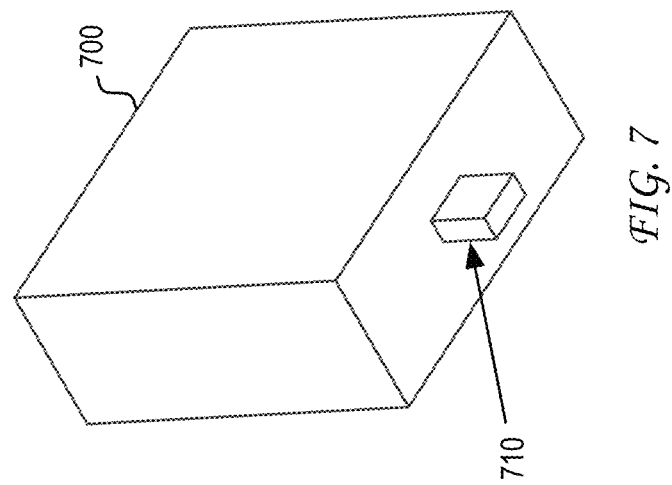
FIG. 7 illustrates an example embodiment of a housing of a bridge unit.

FIG. 7 illustrates an example embodiment of a housing of a bridge unit such as the example illustration of bridge unit 500 in FIG. 5. As illustrated, bridge unit 700 can have a housing configured to support a connector 710. Connector 710 can be configured for pluggable, removable insertion into a corresponding connector interface 610 exposed by the housing of node device 600. The connection of bridge unit 700 to node device 600 via the insertion of connector 710 into connector interface 610 produces a true plug-and-play framework for the deployment of sensors at a monitored location.

Figure 8:
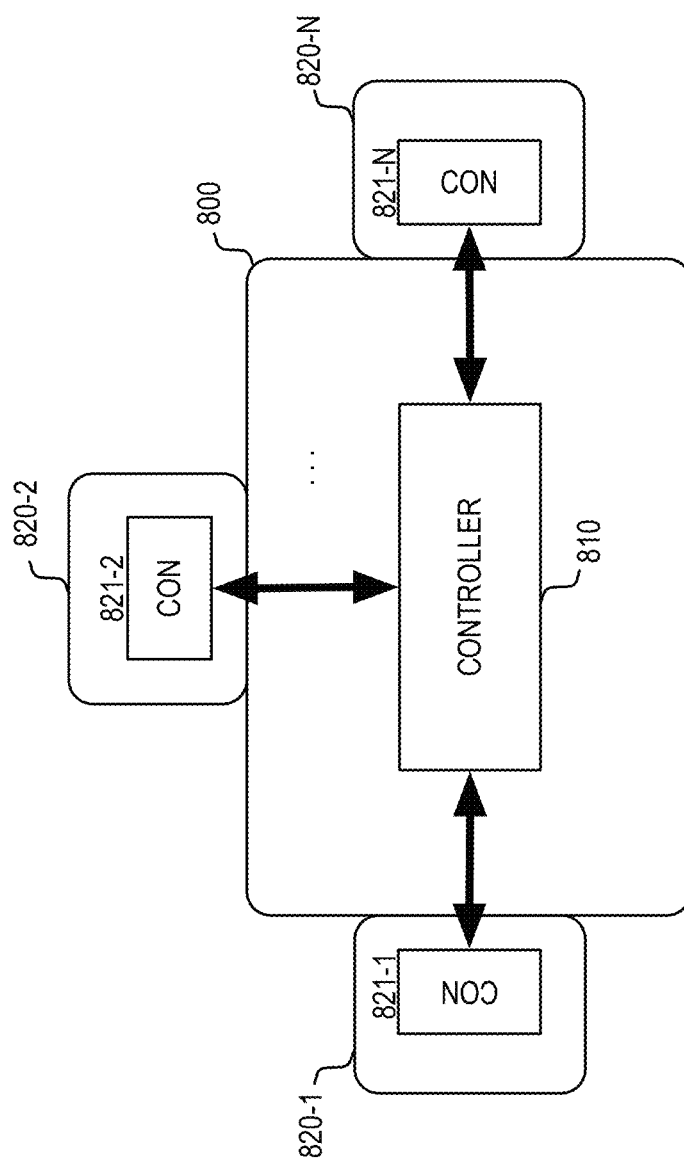
FIG. 8 illustrates an example embodiment of a node device attached to a plurality of bridge units.

FIG. 8 illustrates an example data flow between a node device, such as the example illustration of node device 400 in FIG. 4, and a plurality of supported bridge units. As illustrated, node device 800 interfaces with a plurality of bridge units, including bridge unit 820-1, bridge unit 820-2, . . . , and bridge unit 820-N. Connectors of bridge unit 820-1, bridge unit 820-2, . . . , and bridge unit 820-N are each physically attached to separate connector interfaces exposed by the housing of node device 800. The attachment of bridge unit 820-1 to node device 800 enables communication of data between controller 821-1 and controller 810, the attachment of bridge unit 820-2 to node device 800 enables communication of data between controller 821-2 and controller 810, . . . , and the attachment of bridge unit 820-N to node device 800 enables communication of data between controller 821-N and controller 810. By these attachments, each of bridge units 820-1, 820-2, . . . , and 820-N can be coupled to node device 800 via a universal sensor interface having the connectivity characteristics described above.

Figure 9:
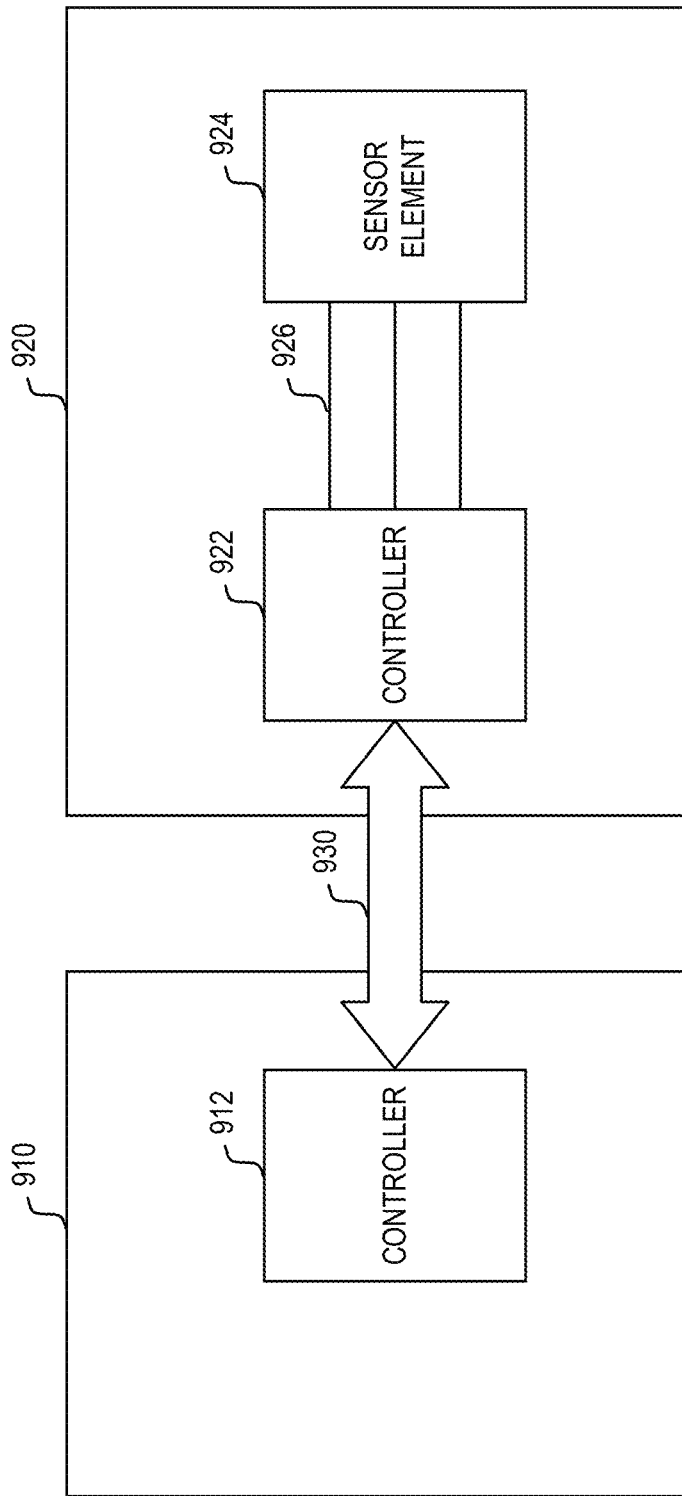
FIG. 9 illustrates an example embodiment of a universal sensor interface.

FIG. 9 illustrates an example embodiment of a universal sensor interface between a node device 910 and a single bridge unit 920. As illustrated, controller 912 in node device 910 communicates with controller 922 in bridge unit 920 via interface connection 930. As described above, interface connection 930 can be based on the removable connection between a connector supported by bridge unit 920 and a connector interface supported by node device 910. In one embodiment, the connector is a mini-USB connector. In another embodiment, the interface connection 930 is supported by hard-wired connections between controller 912 and controller 922. In this embodiment, node device 910 and bridge unit 920 can be integrated within a single housing such that a removable connection would be unneeded.

In one embodiment, interface connection 930 can support device select signaling, clock signaling, data signaling, and availability signaling in addition to a power connection and a ground connection. Details of an example signaling protocol that facilitates communication between node device 910 and bridge unit 920 are described in greater detail below.

As further illustrated in FIG. 9, controller 922 can also interface with sensor element 924 via interface 926. As noted, interface 926 can be a sensor-specific interface that is supported by bridge unit 920. Different bridge unit devices can be designed to support different sensor-specific interfaces. As such, a sensor network node can be configured for a particular sensor application by attaching a particular bridge unit to a node device. In this context, the universal sensor interface facilitates the separation of the node communication infrastructure from sensor-specific interface 926 supported by bridge unit 920 deployed at the location at which supporting node device 910 is installed.

It should be noted that the illustration of sensor-specific interface 926 represents a simple example of a potential bridge unit configuration. In general, a bridge unit can represent any customized unit configured for a particular sensor application. As such, the bridge unit can contain multiple controllers, sensor elements, and other sensor application specific elements that enable an operation geared for a particular purpose. The inclusion of a controller in the custom bridge unit to manage communication with a controller in a node device via the universal sensor interface would enable the custom bridge unit to leverage the node communication infrastructure at the monitored location.

The universal sensor interface can be configured to transfer various types of data between controller 912 in node device 910 and controller 922 in bridge unit 920. For example, the types of data that can be transferred include sensor data received from sensor element 924, status data reported by bridge unit 920, configuration update data used to configure an operation of bridge unit 920, action data that directs bridge unit 920 to perform an action, or any other information useful to enable operation of bridge unit 920 in the context of a sensor network at the monitored location.

In one embodiment, the transfer of data between controller 912 in node device 910 and controller 922 in bridge unit 920 is initiated using a transmission of a command from controller 912 in node device 910 to controller 922 in bridge unit 920. The transmitted command can be used to indicate the type of information to be transmitted from controller 922 in bridge unit 912 to controller 912 in node device 910, or the type of information to be transmitted from controller 912 in node device 910 to controller 922 in bridge unit 920. For example, the transmitted command can be used to indicate that particular sensor data or particular status data (e.g., bridge unit ID, version information, firmware information, error information, or other information indicative of a status or operation of the bridge unit) that should be transmitted from the bridge unit to the node device. In another example, the transmitted command can be used to indicate that particular configuration update data (e.g., operating mode, data resolution, bridge unit sampling rate, or other information that can influence an operation of the bridge unit) or particular action data (e.g., reset command, control response command, or other action to be performed by the bridge unit) that will follow in a subsequent transmission of data from the node device.

The transmission of data in either direction between the node device and the bridge unit can be viewed as a response to the transmitted command. In one embodiment, multiple command-response pairs can be defined to coordinate the transfer of data between the node device and the bridge unit. In another embodiment, a single command can be followed by multiple responses. Here, a single transmitted command could alert the bridge unit that multiple data units will follow in multiple subsequent instances of transmission and/or receiving actions. In one example, a single transmitted command could alert the bridge unit to transmit multiple data units to the node device. In another example, a single transmitted command could alert the bridge unit that the node device will be transmitting multiple data units for receipt by the bridge unit. As would be appreciated, a single transmitted command could alert the bridge unit of any combination of transmission or receiving of data units from the perspective of the bridge unit or node device.

Figure 10:
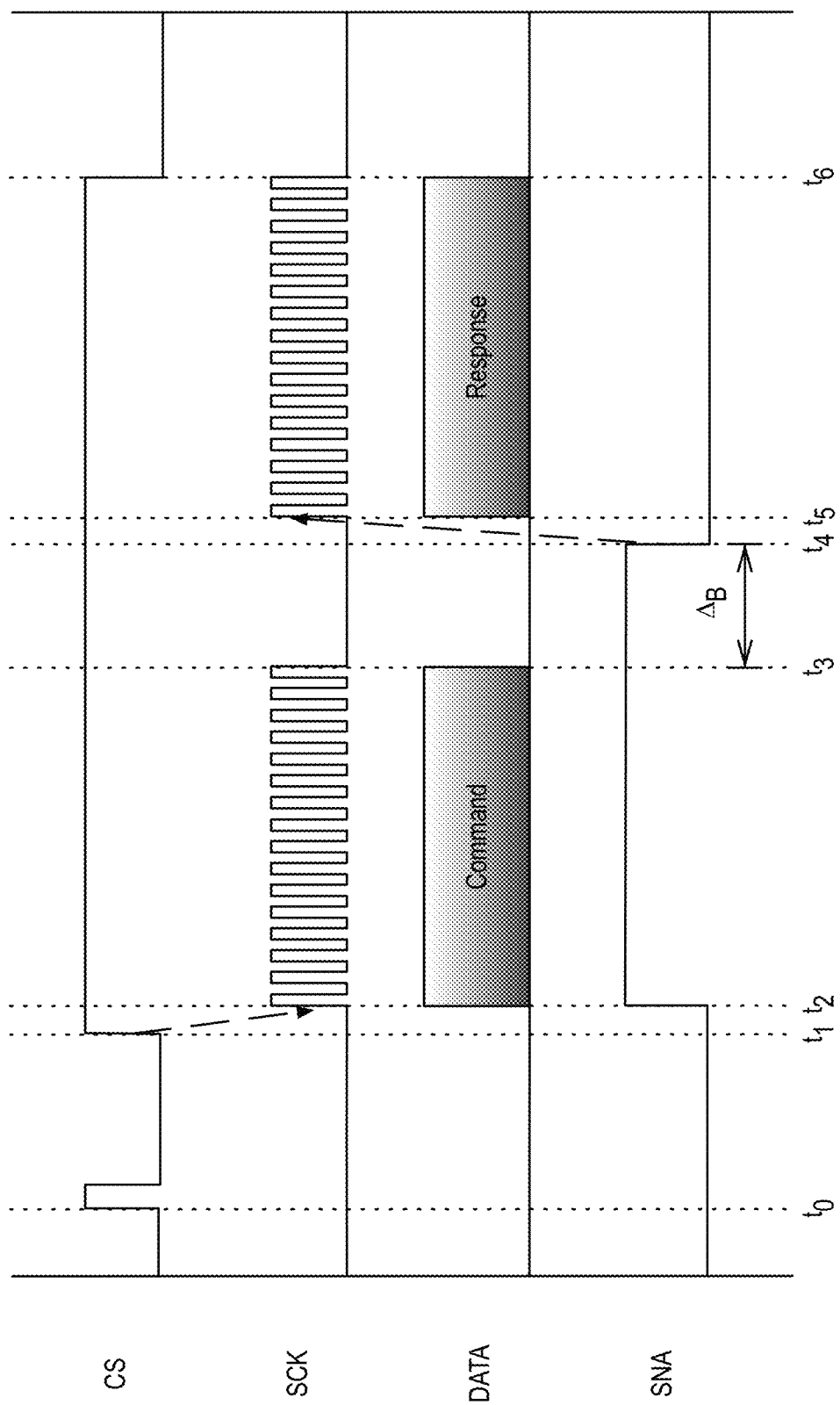
FIG. 10 illustrates an example embodiment of a signaling protocol between a node controller and a bridge controller.

FIG. 10 illustrates an example embodiment of a signaling protocol between a node controller and a bridge controller that can facilitate the transfer of a single command-response pair. In the example illustration, the signaling protocol is based on signals carried over a device select line (CS), a clock line (SCK), a data line (DATA), and an availability line (SNA). It should be noted that unlike a Serial Peripheral Interface (SPI) bus that is based on separate data input and data output lines, the signaling protocol over the universal sensor interface of the present disclosure can be based on a single bi-directional data line.

The CS line can be used to initiate communication between a node device and a selected bridge unit. As noted above, a node device can be connected to a plurality of bridge units using separate universal sensor interfaces. The controller in the node device can therefore use separate pins to drive separate CS lines, which are individually dedicated to separate universal sensor interfaces. In a typical communication scenario, the node device would initiate communication with a selected bridge unit. This can be the case, for example, where the node device is collecting sensor data from the bridge unit, collecting status data from the bridge unit, providing configuration update data to the bridge unit, or providing action data to the bridge unit.

In one embodiment, a bridge unit can be configured to request that a node device collect information from the bridge unit. Here, a bridge controller can transmit a request poll signal on the CS line to alert the node controller that information is ready to be collected from the bridge unit. In one embodiment, the request poll signal can be a pulse that is transmitted from the bridge controller to the node controller over the CS line. As would be appreciated, the particular form of the request poll signal would be implementation dependent. In general, any form of request poll signaling that is distinguishable by the node controller can be used.

As illustrated in the example of FIG. 10, a request poll signal can be transmitted at time $t_0$. Upon detection of the request poll signal on the CS line, the node controller can then initiate a command-response cycle at time $t_1$. The illustrated command-response cycle can represent the first of a plurality of command-response cycles that are initiated by the node controller. In one example, the time period between time $t_0$ and $t_1$ can represent the time it takes for the node controller to prepare for a command-response cycle as part of a process of creating a data or status packet to send to a gateway device. For instance, the node device may require a change in operating state (e.g., transition from a sleep mode) along with certain initialization steps before the node controller transmits a command to the bridge controller that transmitted the request poll signal.

The node controller can begin a command-response cycle using signaling on the CS line. As noted, the command-response cycle can be initiated by the node controller independently of the bridge controller or can be initiated in response to the receipt of a request poll signal from the bridge controller. As illustrated in the example of FIG. 10, the node controller can initiate the command-response cycle by transitioning the CS line from a low level state to a high level state at time $t_1$. This transition in state on the CS line can be detected by the bridge controller, whereupon the bridge controller would transition to a state that allowed interrupts on the detection of rising edges of the first series of clock signals received on the SCK line.

As illustrated in FIG. 10, the node controller can begin transmitting a first series of clock signals on the SCK line at time $t_2$. Upon detection of the first rising edge of the first series of clock signals on the SCK line at time $t_2$, the bridge controller can then transition the SNA line from a low level state to a high level state and receive the first bit of data on the DATA line. In one embodiment, the node controller transmits a first series of 16 clock cycles on the SCK line to enable transmission of a 16-bit command to the bridge controller. In general, the number of clock cycles transmitted can be designed to correspond to the size of data units transferred between the node controller and the bridge controller.

The completed command received at time $t_3$ can then be interpreted by the bridge controller. For example, the received command can indicate that the bridge controller should return certain sensor data generated by a sensor element supported by the bridge unit, return certain status data of the bridge unit, or receive further information in a subsequent transmission. In the present disclosure, it is recognized that a bridge controller can incur variable amounts of delay before the bridge controller is ready for the response phase of the command-response cycle.

For example, consider the return of requested information to the node device. In one scenario, the requested data (e.g., node ID) is already available to the bridge controller and can be immediately returned to the node device. In another scenario, the requested data (e.g., sensor data) may not be readily available to the bridge unit. This can be the case, for instance, where the sensor data is retrieved by the bridge unit from an external sensor element using a separate communication interface protocol (e.g., Modbus). In this illustration, the separate communication interface can introduce a variable amount of delay before the requested sensor data is made available to the bridge unit.

In the present disclosure, it is recognized that introducing a fixed delay between the transmission of the command phase and the response phase of the command-response cycle introduces a number of inefficiencies. First, the fixed delay would penalize the speed at which many command-response cycles can be completed, especially where the requested data is immediately available to the bridge unit. Second, any fixed delay imposed between the command and response phases of the command-response cycle would need to account for a worst-case scenario, thereby penalizing those command-response cycles having response timings that did not approach the worst-case scenario. In the illustrated embodiment, separate command-response cycles can be used to transfer data 16-bits at a time. Where such response data is used by the node device to fill a 102-byte payload in an 802.15.4 wireless packet, the compounding inefficiencies can introduce significant delays in the preparation of a data/status packet.

In the illustrated example of FIG. 10, a variable delay ($\Delta_B$) between the command and response phases of the command-response cycle can be imposed by the bridge controller. This variable delay can be imposed by the bridge controller through a delay in the bridge controller transitioning the signal on the SNA line from the high level state back to the low level state at time $t_4$.

Significantly, since the bridge controller is imposing the variable delay, the bridge controller can ensure that the variable delay matches its readiness for the response phase of the command-response cycle. Where the bridge controller is immediately available for the response phase of the command-response cycle, the variable delay can be reduced to a minimal amount of time. Where the bridge controller is not immediately available for the response phase of the command-response cycle, the variable delay can be lengthened until the point of time that the bridge controller is actually ready for the response phase of the command-response cycle. In one embodiment, the delay can be limited to a maximum amount of time such that a timeout condition can occur from the perspective of the node controller.

When the bridge controller transitions the signal on the SNA line from the high level state back to the low level state at time $t_4$, the bridge controller signals its readiness to the node controller for the response phase of the command-response cycle. Upon detection of the transition of the signal on the SNA line from the high level state to the low level state, the node controller can then prepare to initiate the response phase of the command-response cycle.

The communication of data in the response phase of the command-response cycle is based on the transmission of a second series of clock signals at time $t_5$. This second series of clock signals can be used to either transmit data from the node controller to the bridge controller, or to transmit data from the bridge controller to the node controller. In a similar manner to the command phase of the command-response cycle, the interrupts on the detection of rising edges of the clock signal on the SCK line would be used by the bridge controller to transmit or receive data. At the conclusion of the response phase of the command-response cycle, the node controller would then transition the CS line from the high level state back to the low level state. Further command-response cycles between the node controller and the bridge controller can be performed using the signaling protocol example of FIG. 10. If multiple response phases are indicated by the command phase, then the bridge controller can transition the SNA line from the low level state back to the high level state at a time subsequent to time is such that the bridge controller can signal its readiness to the node controller for the next response phase.

Figure 11:
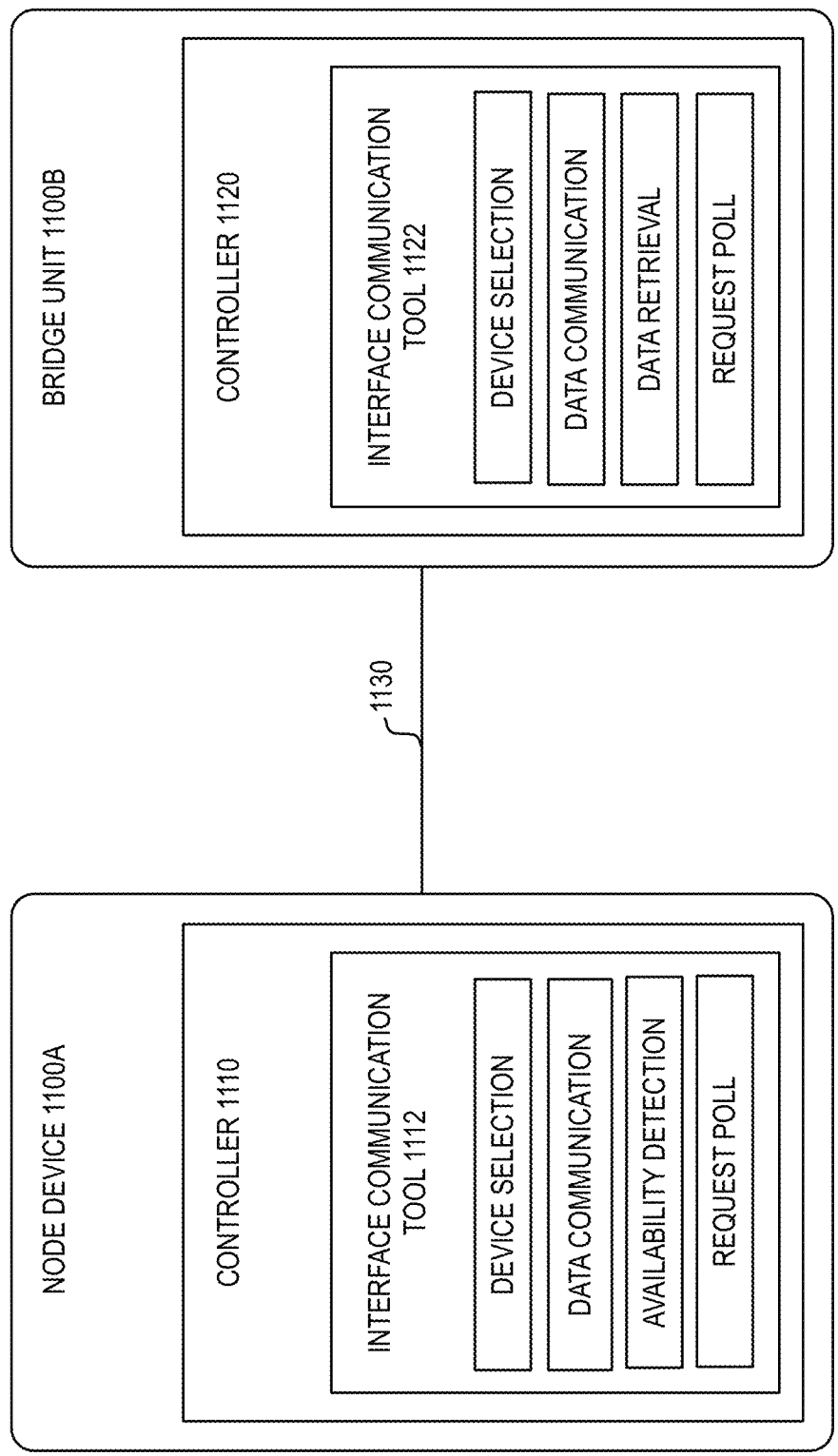
FIG. 11 illustrates a block diagram depicting a bridge unit operatively coupled to a node device according to an embodiment.

As has been described, a signaling protocol between a node controller and a bridge controller over a wired interface can enable efficient data transfers using a single bi-directional data line. FIG. 11 is a block diagram depicting node device 1100A connected to bridge unit 1100B via wired interface 1130. As illustrated in FIG. 11, node device 1100A includes controller 1110, which can be configured to execute interface communication tool 1112. Interface communication tool 1112 can include software code sections (stored in memory or implemented in hardware such as controller 1110) that can include instructions to cause controller 1110 to manage communication by node device 1100A with bridge unit 1100B. Similarly, bridge unit 1100B includes controller 1120 configured to execute interface communication tool 1122. Interface communication tool 1122 can include software code sections (stored in memory or implemented in hardware such as controller 1120) that can include instructions to cause controller 1120 to manage communication by bridge unit 1100B with node device 1100A.

Interface communication tool 1112 can include a device selection section, data communication section, availability detection section, and request poll section. Device selection section can be configured to transition the CS line from a low level state to a high level state when it is determined that a command-response cycle should be initiated. The initiation of a command-response cycle can occur when node device 1100A seeks to retrieve data from bridge unit 1100B or seeks to provide data to bridge unit 1100B.

The data communication section can be configured to control the transmission and reception of data via the bi-directional DATA line. Transmission and receiving subsections can be used for the transmission and reception of data, respectively. In one embodiment, the data communication section can also include a clock generation section that can be configured to transmit a series of clock signals over the SCK line. In one example, the series of clock signals includes a number of cycles (e.g., 16) that can be used by node device 1100A in transmitting or receiving data via the bi-directional DATA line.

The availability detection section can be configured to detect an availability signal transmitted by bridge unit 1100B over the SNA line. In one embodiment, the availability signal is a transition of the SNA line from a high level state to a low level state. As noted, the usage of the availability signal enables node device 1100B to signal when node device 1100B is ready for the response phase of the command-response cycle. The availability signaling by node device 1100B enables node device 1100B to account for variable delays incurred by node device 1100B after receiving a command from node device 1100A. In one embodiment, the detection of the availability signal by the availability detection section can be used to trigger the activation of the data communication section in transmitting or receiving data as part of the response phase of the command-response cycle.

Finally, the request poll section can be configured to detect a request poll signal that is transmitted by bridge unit 1100B on the CS line. In one embodiment, the identification of a particular type of request poll signal can be used to determine the type of processing that is initiated by node device 1100A. For example, the bridge unit can transmit a first type of request poll signal to indicate that a first amount or first type of data is to be collected by node device 1100A, and can transmit a second type of request poll signal to indicate that a second amount or second type of data is to be collected by node device 1100A.

As illustrated, the interface communication tool 1122 can include device selection section, data communication section, data retrieval section, and request poll section. The device selection section can be configured to detect a transition in the CS line from a low level state to a high level state when node device 1100A initiates a command-response cycle. The initiation of a command-response cycle can occur when node device 1100A seeks to retrieve data from bridge unit 1100B or seeks to provide data to bridge unit 1100B. In one embodiment, the device selection section can be configured to enable interrupts on the SCK line for use by the data communication section.

The data communication section can be configured to control the transmission and reception of data via the bi-directional DATA line. Transmission and receiving subsections can be used for the transmission and reception of data, respectively. In one embodiment, the data communication section is responsive to interrupts that are triggered by the rising edges of a series of clock signals transmitted by node device 1100A over the SCK line. In one example, the series of clock signals includes a number of cycles (e.g., 16) that can be used by bridge unit 1100B in transmitting or receiving data via the bi-directional DATA line.

The data retrieval section can be configured to retrieve data that is to be transmitted to node device 1100A or to retrieve data that is received from node device 1100A. The particular data that is retrieved can be identified by the command that is received from node device 1100A.

Finally, the request poll section can be configured to transmit a request poll signal on the CS line. In one embodiment, the identification of a particular type of request poll signal can be used to determine the type of processing that is to be initiated by node device 1100A. For example, the bridge unit can transmit a first type of request poll signal to indicate that a first amount or first type of data is ready for collection by node device 1100A, and can transmit a second type of request poll signal to indicate that a second amount or second type of data is ready for collection by node device 1100A.

Another embodiment of the present disclosure can provide a machine and/or computer readable storage and/or medium, having stored thereon, a machine code and/or a computer program having at least one code section executable by a machine and/or a computer, thereby causing the machine and/or computer to perform the steps as described herein.

Those of skill in the relevant art would appreciate that the various illustrative blocks, modules, elements, components, and methods described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Those of skill in the relevant art can implement the described functionality in varying ways for each particular application. Various components and blocks may be arranged differently (e.g., arranged in a different order, or partitioned in a different way) all without departing from the scope of the subject technology.

These and other aspects of the present disclosure will become apparent to those skilled in the relevant art by a review of the preceding detailed disclosure. Although a number of salient features of the present disclosure have been described above, the principles in the present disclosure are capable of other embodiments and of being practiced and carried out in various ways that would be apparent to one of skill in the relevant art after reading the present disclosure, therefore the above disclosure should not be considered to be exclusive of these other embodiments. Also, it is to be understood that the phraseology and terminology employed herein are for the purposes of description and should not be regarded as limiting.

What is claimed is:

1. An expansion subsystem, comprising:
   an interface connection configured for coupling the expansion subsystem to a wireless communication subsystem having a wireless transceiver; and
   a controller, including:
      a first pin for receiving clock signals that are transmitted from the wireless communication subsystem,
      a second pin for communication of data between the expansion subsystem and the wireless communication subsystem using clock signals received via the first pin, and
      a third pin for availability signaling between the expansion subsystem and the wireless communication subsystem, the expansion subsystem signaling an availability of requested data to the wireless communication subsystem via the third pin, which causes the wireless communication subsystem to transmit a series of clock signals to the expansion subsystem via the first pin for transmission of the requested data.

2. The expansion subsystem of claim 1, further including a sensor element for collecting sensor data.

3. The expansion subsystem of claim 1, wherein one of the pins in the interface connection is used to transmit power from the wireless communication subsystem to the expansion subsystem.

4. The expansion subsystem of claim 1, wherein the controller delays the transmission of the availability signal until sensor data is available for transmission to the wireless communication subsystem.

5. The expansion subsystem of claim 1, wherein the availability signal is a transition from a high logic state to a low logic state.

6. The expansion subsystem of claim 5, wherein the controller further includes a fourth pin for device select signaling between the expansion subsystem and the wireless communication subsystem.

7. The expansion subsystem of claim 6, wherein the controller transmits a request poll signal to the wireless communication subsystem via the fourth pin prior to the receipt by the expansion subsystem of a device selection signal, wherein the device selection signal is produced in response to the request poll signal.

8. The expansion subsystem of claim 1, wherein the sensor data is environmental data.

9. The expansion subsystem of claim 1, wherein the sensor data is occupancy data.

10. The expansion subsystem of claim 1, wherein the sensor data is air quality data.

11. The expansion subsystem of claim 1, wherein the sensor data is Modbus device data.

12. The expansion subsystem of claim 1, wherein the sensor data is BACnet device data.

13. The expansion subsystem of claim 1, wherein the interface connection includes a connector interface.

14. A controller subsystem, comprising:
    an interface connection configured for coupling the controller subsystem to a wireless communication subsystem having a wireless transceiver; and
    a controller configured for serial communication via the interface connection, the serial communication enabling the controller subsystem to signal an availability of sensor data to the wireless communication subsystem, the availability signaled by the controller subsystem causing the wireless communication subsystem to transmit a series of clock signals to the controller subsystem for transmission of the sensor data from the controller subsystem to the wireless communication subsystem.

15. The controller subsystem of claim 14, wherein the sensor data is environmental data.

16. The controller subsystem of claim 14, wherein the sensor data is occupancy data.

17. The controller subsystem of claim 14, wherein the sensor data is air quality data.

18. The controller subsystem of claim 14, wherein the sensor data is Modbus device data.

19. The controller subsystem of claim 14, wherein the sensor data is BACnet device data.

20. A non-transitory computer-readable medium having an interface communication tool stored thereon for use on a controller subsystem for enabling collection of sensor data, the controller subsystem having an interface connection to a wireless communication subsystem, the interface communication tool including:
    a first section that when executed, causes the interface communication tool to delay transmission of an availability signal to the wireless communication subsystem until the sensor data is available for transmission; and
    a second section that when executed, causes the interface communication tool to transmit, in response to a series of clock signals received via the interface connection, the sensor data to the wireless communication subsystem, wherein the series of clock signals is transmitted by the wireless communication subsystem in response to the detection of the availability signal.

* * * * *